United States Patent
Pretzlaff et al.

(10) Patent No.: US 12,368,006 B2
(45) Date of Patent: Jul. 22, 2025

(54) CAPACITOR WITH STEPPED CATHODE

(71) Applicant: BIOTRONIK SE & Co. KG, Berlin (DE)

(72) Inventors: Bernd Pretzlaff, Mildstedt (DE); Janosch Lichtenberger, Bremen (DE)

(73) Assignee: BIOTRONIK SE & Co. KG, Berlin (DE)

( * ) Notice: Subject to any disclaimer, the term of this patent is extended or adjusted under 35 U.S.C. 154(b) by 51 days.

(21) Appl. No.: 18/261,781

(22) PCT Filed: Feb. 11, 2022

(86) PCT No.: PCT/EP2022/053315
§ 371 (c)(1),
(2) Date: Jul. 17, 2023

(87) PCT Pub. No.: WO2022/175166
PCT Pub. Date: Aug. 25, 2022

(65) Prior Publication Data
US 2024/0112866 A1 Apr. 4, 2024

(30) Foreign Application Priority Data
Feb. 19, 2021 (EP) .................................. 21158169

(51) Int. Cl.
| | | |
|---|---|---|
| *H01G 9/08* | (2006.01) | |
| *H01G 9/00* | (2006.01) | |
| *H01G 9/048* | (2006.01) | |

(52) U.S. Cl.
CPC .............. *H01G 9/08* (2013.01); *H01G 9/0029* (2013.01); *H01G 9/048* (2013.01)

(58) Field of Classification Search
None
See application file for complete search history.

(56) References Cited

U.S. PATENT DOCUMENTS 3,243,316 A * 3/1966 O'Nan ..................... H01G 9/08
427/105
4,016,465 A * 4/1977 Walters ................ H01G 9/0425
252/62.2
(Continued)

FOREIGN PATENT DOCUMENTS

EP 3163593 A1 5/2017

OTHER PUBLICATIONS

European Search Report mailed on Jul. 27, 2021, by the European Patent Office for Application No. EP 21158169.9. (8 pages).
(Continued)

*Primary Examiner* — Eric W Thomas
(74) *Attorney, Agent, or Firm* — Buchanan Ingersoll & Rooney PC

(57) ABSTRACT

The present invention relates to a capacitor having an electrically conductive housing with a housing inner surface and a housing interior substantially defined by the housing inner surface, at least one first electrode having a first polarity and being arranged in the housing interior, at least one separator element being arranged between the housing inner surface and the at least one first electrode, and an electrically conductive coating being arranged between the housing inner surface and the at least one separator element. The housing inner surface includes at least one recess, and the electrically conductive coating is arranged in the at least one recess.

13 Claims, 3 Drawing Sheets

(56) References Cited

U.S. PATENT DOCUMENTS

| 5,001,607 A * | 3/1991 | Breithaupt | H01G 9/0425 |
| | | | 29/25.03 |
| 6,791,821 B1 * | 9/2004 | Monnett | H01G 9/0425 |
| | | | 361/523 |
| 2010/0142124 A1 * | 6/2010 | Dreissig | H01G 9/0425 |
| | | | 205/112 |
| 2013/0242468 A1 * | 9/2013 | Pinwill | H01G 9/055 |
| | | | 451/54 |
| 2020/0294725 A1 * | 9/2020 | Dorr | H01G 9/042 |

OTHER PUBLICATIONS

International Search Report (PCT/ISA/210) and Written Opinion (PCT/ISA/237) mailed on May 9, 2022, by the European Patent Office as the International Searching Authority for International Application No. PCT/EP2022/053315. (9 pages).

* cited by examiner

CAPACITOR WITH STEPPED CATHODE

CROSS-REFERENCE TO RELATED APPLICATIONS

This application is the United States National Phase under 35 U.S.C. § 371 of PCT International Patent Application No. PCT/EP2022/053315, filed on Feb. 11, 2022, which claims the benefit of European Patent Application No. 21158169.9, filed on Feb. 19, 2021, the disclosures of which are hereby incorporated by reference herein in their entireties.

TECHNICAL FIELD

The present invention relates to a capacitor and a method of manufacture thereof.

BACKGROUND

In capacitors like electrolytic tantalum or niobium capacitors, the cathode in form of an electrolyte is typically electrically contacted from the outside via an electrically conductive housing acting as cathode current collector, while the anode, e.g., in form of a sintered and anodized metal body, is contacted form the outside via an electrical feedthrough electrically insulated from the housing. For electrically contacting the cathode, such capacitors commonly utilize an electrically conductive coating applied on the inside of the capacitor's housing, which can be wetted by the electrolyte. Electrolytic capacitors further comprise at least one separator element, e.g., in form of a pouch enveloping the anode, which provides an electric insulation between anode and housing or coating, respectively, in order to prevent an undesired shout circuit.

However, in such common electrolytic capacitor, the separator element usually is in direct substantial physical contact with the electrically conductive coating, exposing the coating potentially to mechanical stress applied by the separator element, e.g., in case of vibrations, shocks or mechanical pressure. In addition, such coatings exhibit rather inferior mechanical stability compared to, for example, the separator element or the housing. Consequently, the coating may be mechanical impaired or damaged by the separator element, e.g., by abrasion, which may result in short circuits and loss of the capacitor.

In order to overcome the above problem, one solution known in the art is to adjust the thickness of the separators. However, this solution is rather unsure, and in addition, by using thicker separator elements, the electrical series resistance is increased, which in turn decreases the efficiency of the capacitor.

The present disclosure is directed toward overcoming one or more of the above-mentioned problems, though not necessarily limited to embodiments that do.

SUMMARY

Accordingly, it is an objective of the present invention to provide means and method for improving the reliability of capacitors.

At least this objective is attained by a capacitor having the features of embodiments disclosed herein and a method for manufacturing such embodiments disclosed herein.

An exemplary embodiment relates to a capacitor including an electrically conductive housing having a housing inner surface and a housing interior substantially defined by the housing inner surface, at least one first electrode 20 having a first polarity and being arranged in the housing interior, at least one separator element being arranged between the housing inner surface and said at least one first electrode, and an electrically conductive coating being arranged between the housing inner surface and the at least one separator element.

According to the present invention, it is particularly envisioned that the housing inner surface comprises at least one recess or depression, and the electrically conductive coating is arranged in the at least one recess or depression. Advantageously, the at least one separator element is not in substantial or is only in neglectable physical contact with the electrically conductive coating, wherein particularly the at least one separator element does not exercise physical stress on the electrically conducting coating, which can impair the integrity of the coating.

Advantageously, the reliability of the capacitor can be improved in general, and in addition, tribologically lower performing, but more costs and manufacturing efficient coatings may be used while keep the reliability of the capacitor.

Particularly, such recess or depression in the housing inner surface may be provided by techniques such as machining, stamping, embossing, deep drawing or the like. Also possible are techniques such as etching or ablating, e.g., with a laser, in order to provide the depression. In this context, the skilled person will appreciate that such recess or depression may also be provide by arranging protruding elements such as beams, struts or like on the housing inner surface.

Particularly, the at least one recess or depression is limited by a protrusion, web, or bar, particularly a circumferential protrusion, web or bar, extending from the housing inner surface into the interior of the capacitor, wherein the at least one separator element is supported essentially by the protrusion, web or bar, particularly mechanically or physically supported. In other words, the at least one separator element is pressed essentially against the protrusion, web or bar in the assembled state.

In one embodiment, the capacitor of the present invention is configured as an electrolytic capacitor, wherein a second electrode having a second polarity is configured as an electrolyte, and the electrolyte is in electrically conductive communication with the electrically conductive coating.

In one embodiment of the capacitor of the present invention, the at least one recess or depression has a depth in range of 10 µm to 500 µm.

In one embodiment of the capacitor of the present invention, the electrically conductive coating has a thickness in the range of 2 µm to 400 µm.

In one embodiment of the capacitor of the present invention, the electrically conductive coating comprises electrically conductive carbon, particularly in form of graphite, graphene, activated carbon, charcoal, carbon black, a carbon nanotube or a fullerene, or a conductive polymer. In one embodiment, the electrically conductive coating comprises a binder. In one embodiment, the binder is selected from polyvinylidene fluoride (PVDF) polytetrafluoroethylene (PTFE), carbomethyl cellulose (CMC) or a rubber, particularly acryl rubber, nitrile butadiene rubber (NBR), styrene butadiene rubber (SBR) or butyl rubber.

In one embodiment of the capacitor of the present invention, the electrolyte is an aqueous electrolyte. In one embodiment, the electrolyte comprises ethylene glycol and optionally an acid, particularly boric acid or acetic acid, particularly in case of the anode is formed by tantalum. In one embodiment, the electrolyte comprises ethylene glycol, acetic acid and ammonium acetate. In one embodiment, the electrolyte comprises dimethylformamide, dimethylacetamide and/or gamma-butyrolactone. In one embodiment, the electrolyte comprises tetracyanoquinodimethane, polypyrrole, or poly(3,4-ethylenedioxythiophene).

In one embodiment of the capacitor of the present invention, the at least one first electrode comprises or essentially consists of a valve metal. In one embodiment, the valve metal is selected from tantalum or niobium. In one embodiment, the capacitor of the present invention comprises one first electrode, wherein the first electrode substantially is a body of sintered and anodized tantalum. In one embodiment, the body of sintered and anodized tantalum is substantially enclosed by one separator element, being particularly designed as a pouch.

In one embodiment of capacitor of the present invention, the housing comprises or is formed by a beaker portion and a lid portion, wherein the at least one recess or depression is comprised within an inner surface of the beaker portion or the lid portion. In one embodiment, the lid portion comprises an electrical feedthrough configured to electrically contact the at least one first electrode, and optionally an opening for filling in the electrolyte.

In one embodiment of the capacitor of the present invention, the housing is made of titanium or a titanium alloy.

In one embodiment of the capacitor of the present invention, the housing comprises a plurality of recesses or depressions, each of which comprising the electrically conductive coating.

In one embodiment of the capacitor of the present invention, the at least one separator element comprises or essentially consists of cellulose (paper), polyethylene, polypropylene, polytetrafluoroethylene, polyvinylidene fluoride, ethylene chlorotrifluoroethylene, or polysulfone. According to claim 10, a method for manufacturing a capacitor is provided, particularly for manufacturing the capacitor of the present invention as described above. The method comprises the steps of:

provifing an electrically conductive housing having a housing inner surface and a housing interior substantially defined by the housing inner surface, wherein at least one depression or recess is provided in the housing inner surface, applying an electrically conductive coating in the at least one recess or depression, arranging at least one first electrode in the housing interior, and arranging at least one separator element between the at least one first electrode and the housing inner surface.

Particularly, at least one recess or depression is limited by a protrusion, web, or bar, particularly a circumferential protrusion, web or bar, protruding from the housing inner surface into the interior of the capacitor, wherein arranging at least one separator element between the at least one first electrode and the housing inner surface includes that the at least one separator element is supported essentially by the protrusion, web or bar, particularly mechanically or physically supported or, in other words, the at least one separator element is pressed essentially against the protrusion, web or bar in the assembled state.

In one embodiment of the method of the present invention, the at least one recess or depression is provided in said housing inner surface by deep drawing, etching, ablating, machining, stamping or embossing. In one embodiment, a plurality of recesses or depressions is provided in the housing inner surface, and the electrically conductive coating is applied in each of the plurality of recesses or depressions.

In one embodiment of the method of the present invention, the electrically conductive housing is provided in form of a beaker portion and a lid portion. The beaker portion may be provided by suitable techniques such as machining or deep drawing.

In one embodiment of the method of the present invention, the beaker portion and the lid portion are joined, particularly welded, particularly after assembly of the other above-mentioned components of the capacitor of the present invention, e.g., the first electrode and/or the at least one separator element, in the housing.

In one embodiment, the lid portion is provided with an electrical feedthrough configured to electrically contact the at least one first electrode electrically insulated from the housing, and optionally an opening for filling-in an electrolyte.

Additional features, aspects, objects, advantages, and possible applications of the present disclosure will become apparent from a study of the exemplary embodiments and examples described below, in combination with the Figures and the appended claims.

BRIEF DESCRIPTION OF THE DRAWINGS

Further advantages, features and embodiments of the present invention will be explained hereinafter with reference to the drawings, in which.

DETAILED DESCRIPTION

Figure 1A:
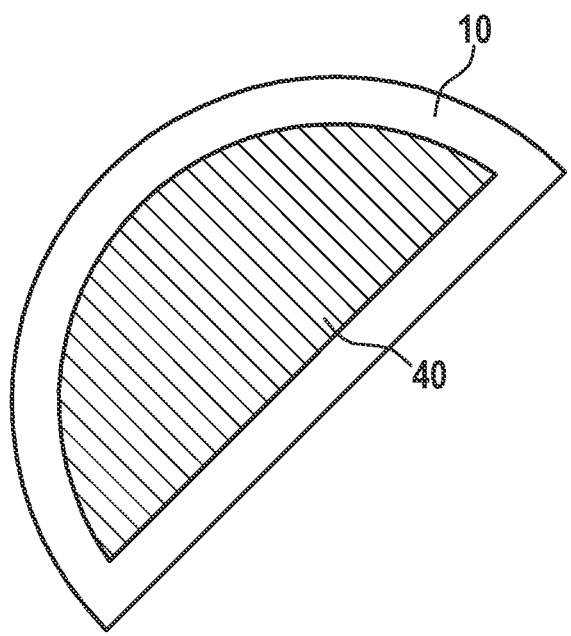
FIGS. 1A-1B show a schematic drawing of a housing and an electrically coating of a prior art capacitor.
Figure 1B:
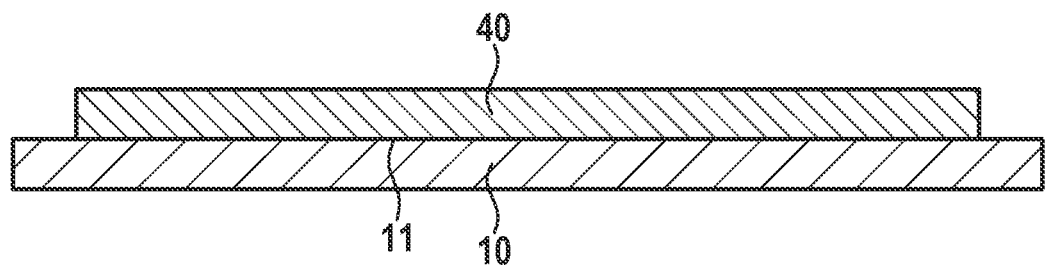

FIG. 1 illustrates a prior art electrolytic capacitor, more precisely a part of an electrically conductive housing 10 that acts as a current collector for the cathode of the capacitor. For contacting the cathode (electrolyte), an electrically conductive coating 40 comprising, e.g., activated carbon and suitable binder, is applied on an inner surface 11 of the housing 10. In this configuration, a separator 30 enveloping the anode (not shown in FIG. 1) may exercise substantial physical stress on the electrically conductive coating 40 and, thus, may damage the latter, e.g., by abrasion.

Figure 2A:
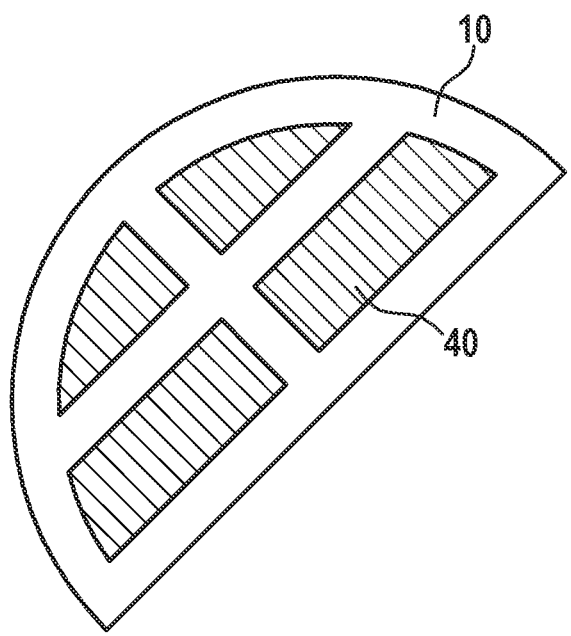
FIGS. 2A-2B show a schematic drawing of a housing and an electrically coating according to the present invention.
Figure 2B:
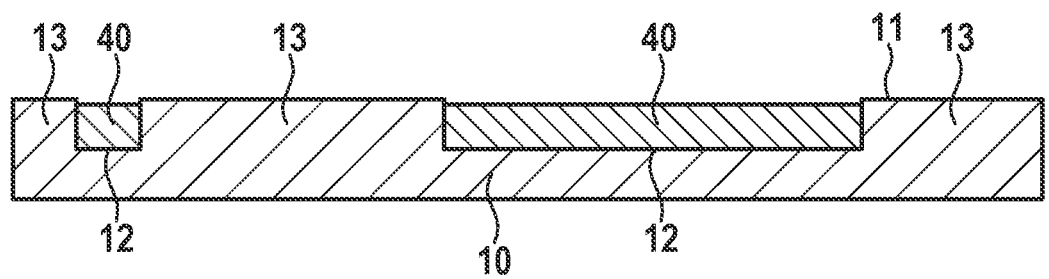
Figure 3:
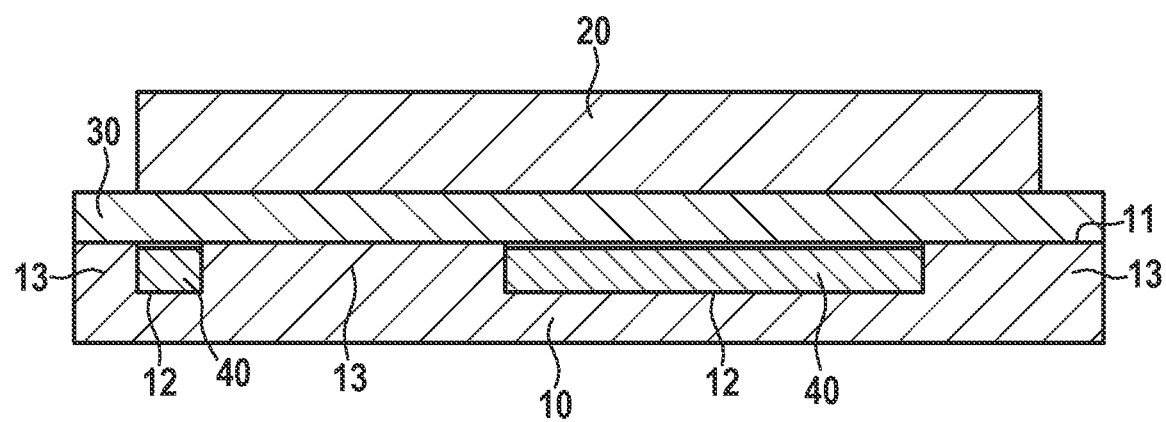
FIG. 3 shows an embodiment of the capacitor of the present invention.

In contrast to the above, the capacitor of the present invention comprises an electrically conductive housing 10, e.g., made of titanium, and having one or more recesses or depression 12, in which the electrically conductive coating 40 is applied, as shown in FIG. 2. Thereby, the one or more recesses or depressions 12 are limited or confined by bars or webs 13. As can be seen in more detail in FIG. 3, the separator 30 is substantially (mechanically or physically) supported by the bars or webs 13 but not or only in a neglectable amount by the electrically conductive coating 40. By that, the separator 30 may exercise a substantial physical stress on the bars or webs 13, but not on the electrically conductive coating 40. Accordingly, damage of the electrically conductive coating 40 by the separator 30 may be reduced or inhibited.

Such recess or depression 12 may be provided in a beaker portion and/or a lid portion of the housing 10 by, for example, deep drawing, stamping or embossing, or alternative or additionally, by laser ablating or etching. After forming of the recess(es) or depression(s) 12, the electrically conductive coating 40 is applied in the recess(es) or depression(s) 12.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

The invention claimed is:

1. A capacitor comprising:
    an electrically conductive housing having a housing inner surface and a housing interior substantially defined by said housing inner surface,
    at least one electrode having a first polarity and being arranged in said housing interior,
    at least one separator element being arranged between said housing inner surface and said at least one electrode, and
    an electrically conductive coating being arranged between said housing inner surface and said at least one separator element,
    wherein
    said housing inner surface comprises at least one recess, and
    said electrically conductive coating is arranged in and confined within a volume of space defined by said at least one recess and the at least one separator element.

2. The capacitor according to claim 1, wherein the at least one recess is limited by a web extending from the housing inner surface into the interior of the capacitor, wherein the at least one separator element is supported essentially by the web.

3. The capacitor according to claim 1, wherein said electrically conductive coating comprises carbon.

4. The capacitor according to claim 1, wherein said at least one recess has a depth in the range of 10 μm to 500 μm.

5. The capacitor according to claim 1, wherein said electrically conductive coating has a thickness in the range of 2 μm to 400 μm.

6. The capacitor according to claim 1, wherein said electrically conductive coating comprises graphite, graphene, activated carbon, charcoal, carbon black, a carbon nanotube, a fullerene, or a conductive polymer.

7. The capacitor according to claim 1, wherein the at least one electrode comprises a valve metal.

8. The capacitor according to claim 1, wherein said housing comprises a beaker portion and a lid portion, wherein said at least one recess is formed within an inner surface of said beaker portion or said lid portion.

9. The capacitor according to claim 1, wherein said housing comprises titanium or a titanium alloy.

10. A method for manufacturing a capacitor, comprising the steps of:
    providing a housing having a housing inner surface and a housing interior substantially defined by said housing inner surface, wherein at least one recess is provided in said housing inner surface,
    applying an electrically conductive coating in said at least one recess, wherein said electrically conductive coating is confined to a volume of space defined by said at least one recess and the at least one separator element,
    arranging at least one electrode in said housing interior, and
    arranging at least one separator element between said at least one electrode and said housing inner surface.

11. The method according to claim 10, wherein said at least one recess is provided in said housing inner surface by deep drawing, etching, ablating, machining, stamping or embossing.

12. The method according to claim 10, wherein said housing is provided in form of a beaker portion and a lid portion.

13. The method according to claim 12, wherein beaker portion and the lid portion are joined via a weld.

* * * * *